(12) United States Patent
McMillan (10) Patent No.: US 11,875,687 B2
(45) Date of Patent: Jan. 16, 2024

(54) MULTIPATHING FOR UNMANNED AERIAL VEHICLE TRAFFIC

(71) Applicant: Verizon Patent and Licensing Inc., Basking Ridge, NJ (US)

(72) Inventor: Daniel William McMillan, Portland, OR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 136 days.

(21) Appl. No.: 17/130,391

(22) Filed: Dec. 22, 2020

(65) Prior Publication Data
US 2022/0198940 A1  Jun. 23, 2022

(51) Int. Cl.
| | | |
|---|---|---|
| G08G 5/00 | (2006.01) | |
| H04B 7/185 | (2006.01) | |
| H04W 84/02 | (2009.01) | |
| H04W 4/44 | (2018.01) | |
| B64U 101/20 | (2023.01) | |
| G05D 1/00 | (2006.01) | |
| B64C 39/02 | (2023.01) | |

(52) U.S. Cl.
CPC ......... *G08G 5/0004* (2013.01); *B64C 39/024* (2013.01); *G05D 1/0027* (2013.01); *H04B 7/18506* (2013.01); *H04W 4/44* (2018.02); *H04W 84/02* (2013.01); *B64U 2101/20* (2023.01)

(58) Field of Classification Search
CPC ....... H04L 1/1819; H04L 1/1816; H04L 1/18; H04L 1/16; H04L 1/08; G08G 5/0004; G08G 5/0008; G08G 5/0013; B64C 39/024; B64C 2201/122; G05D 1/0027; G05D 1/0022
USPC .... 701/3; 709/201, 202, 203, 204, 205, 206, 709/207, 239, 241, 249
See application file for complete search history.

(56) References Cited

U.S. PATENT DOCUMENTS

| | | | | |
|---|---|---|---|---|
| 2018/0247544 | A1* | 8/2018 | Mustafic | H04W 48/04 |
| 2018/0284758 | A1* | 10/2018 | Cella | G05B 23/0291 |
| 2019/0012922 | A1* | 1/2019 | Selander | G08G 5/0026 |
| 2019/0116470 | A1* | 4/2019 | Balasubramanian | H04W 4/08 |
| 2020/0252838 | A1* | 8/2020 | Akdeniz | H04W 64/006 |
| 2020/0257559 | A1* | 8/2020 | Suvitie | H04L 67/125 |
| 2020/0314796 | A1* | 10/2020 | Lee | H04W 68/02 |
| 2020/0336901 | A1* | 10/2020 | Zhu | H04W 12/61 |

* cited by examiner

*Primary Examiner* — Angela Y Ortiz
*Assistant Examiner* — Aaron K McCullers (57) ABSTRACT

A method may include receiving, from an unmanned aerial vehicle (UAV), a first message via a first network using User Datagram Protocol (UDP). The method may further include determining whether a second message that is identical to the first message has been received from the UAV via a second network that is different than the first network. The method may additionally include processing the first message when the second message has not been received and discarding the first message when the second message has been received.

20 Claims, 4 Drawing Sheets

MULTIPATHING FOR UNMANNED AERIAL VEHICLE TRAFFIC

BACKGROUND INFORMATION

Unmanned Aerial Vehicles (UAVs), also referred to as drones, may transmit telemetry information to devices on the ground via different types of networks. Each type of network may include advantages and disadvantages. In addition, different networks may be unreliable or provide high latency in certain situations. To achieve the highest reliability and lowest latency, information may be transmitted from a UAV to a ground device simultaneously via two different networks.

DETAILED DESCRIPTION OF PREFERRED EMBODIMENTS

The following detailed description refers to the accompanying drawings. The same reference numbers in different drawings may identify the same or similar elements.

A UAV may periodically transmit telemetry information to a ground device while the UAV is in flight. In some situations, the telemetry information may be transmitted periodically—for example, every few seconds or even every second. When receiving telemetry information from a UAV, it is important for the communication link to be fast and reliable so that the information will reflect the current state and/or environment of the UAV.

UDP (User Datagram Protocol) is a communications protocol used for establishing low latency and loss-tolerant connections. Using UDP, such as by means of the constrained application protocol (CoAP), a receiver does not need to acknowledge to the sender that every packet was received. UDP may be useful for time sensitive information since it may be preferable to drop stale information when a connection is down or suffering high latency than to buffer the information and attempt to transmit the information when the connection has been restored. For example, assume a UAV transmits location information every second during a flight, there is a loss of connection at time n, and the connection is restored at time n+r (i.e., r seconds after the connection was lost). At time n+r, it may not be useful to receive an indication of the previous location of the UAV at time n. Instead, it may be more useful to drop a packet sent at time n than to receive an indication of where the UAV was located at time n.

Implementations described herein may provide systems and methods for UAVs to transmit multiple messages including the same telemetry information to ground systems simultaneously via more than one network utilizing UDP. For example, a UAV may transmit a message or packet to a ground device via a cellular network and via a satellite network. In one implementation, the ground system may process the first message or packet that is received from a UAV over the first network and may discard the duplicate message or packet received over the second network. In one implementation, each message or packet may be marked with an identifier and messages or packets including the same telemetry information may be marked with the same identifier. When the ground system receives a message or packet, the ground system may use the identifier to determine if a message or packet with the same telemetry information has been received. If a message or packet with the same telemetry information has not been received, the ground system may process the message or packet. If the message or packet with the telemetry information has already been received, the ground system may discard the duplicate message or packet.

Implementations described herein may provide a reliable means for transmitting information from a UAV to a ground system by simultaneously transmitting the information over more than one communication network link. For example, if one communications network link is experiencing drops, congestion or higher levels of latency, transmissions over a second communications network may be unaffected and received in a timely manner. By providing duplicate messages or packets over more than one network, the messages or packets may be reliably transmitted with a lowest level of latency possible.

Figure 1:
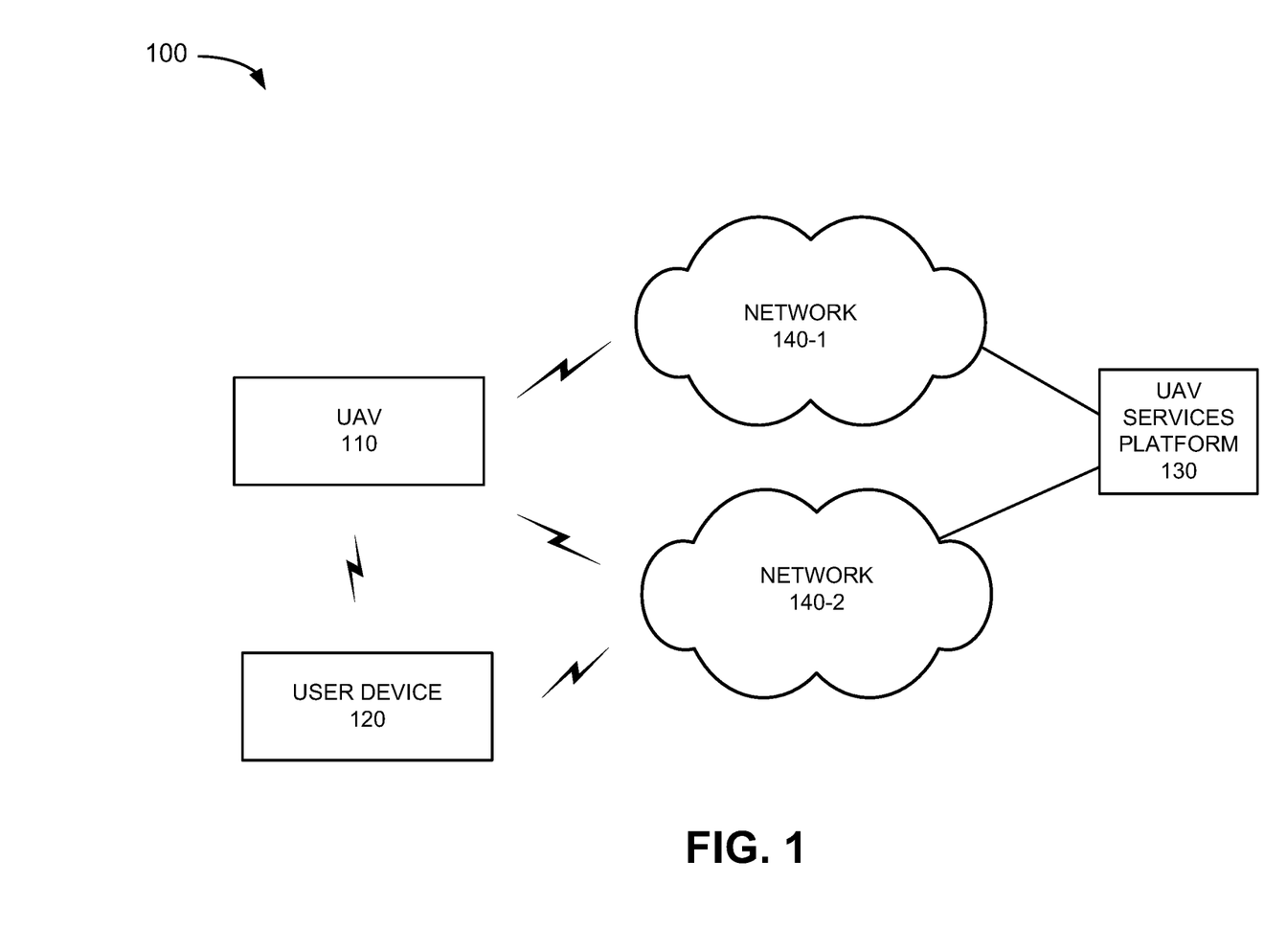
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes UAV 110 (also referred to herein as drone 110), user device 120, UAV services platform/system 130, and networks 140-1 and 140-2.

UAV 110 may include an aircraft (e.g., a single rotor aircraft, multirotor aircraft or fixed wing aircraft) that receives control signals from a controller, such as user device 120. In implementations described herein, UAV 110 may receive signals from a transmitter associated with the controller to control the flight of UAV 110. For example, the altitude of UAV 110 may be changed via signals from user device 120 to maneuver UAV 110 based on the particular flight goals. In some implementations, UAV 110 may include at least one type of cellular communication capability (e.g., fourth generation long term evolution (4G LTE) communication capability, fifth generation (5G) communication capability, etc.) to allow UAV 110 to receive commands from a remotely located user device 120 and/or a short range wireless communication capability (e.g., WiFi) to allow UAV 110 to receive commands from user device 120 located relatively close to UAV 110.

User device 120 may include a controller to control operation of UAV 110. For example, user device 120 may include a user interface to allow a user to control the flight pattern of UAV 110, receive information from various sensors on UAV 110, operate a camera on UAV 110, read information from various sensors on UAV 110, etc. In some implementations, user device 120 may be located in relatively close proximity to UAV 110 and control operation of UAV 110 wirelessly via a short range connection (e.g., WiFi). In other implementations, user device 120 may be located remotely with respect to UAV 110. In this implementation, user device 120 may include any computer device used to transmit information to UAV 110 (e.g., commands) and receive data from UAV 110 (e.g., telemetry information) via, for example, UAV services platform 130 over networks 140-1 and 140-2. For example, user device 120 may include a mobile phone, laptop computer, tablet computer, desktop computer, wearable computer (e.g., eyeglasses or wristwatch), etc., that includes communication functionality and is able to provide, for example, commands to UAV 110 via networks 140-1 and 140-2 and receive telemetry information from UAV 110 via networks 140-1 and 140-2 or via a separate network or connection.

UAV services platform 130 may include one or more computing devices configured to interface with UAV 110 and user device 120 to provide various services to UAV 110 and UAV operators. UAV services platform 130 may receive telemetry data associated with UAV 110. UAV services platform 130 may also provide an interface for receiving commands from user device 120 to control the operation of UAV 110, as well as provide telemetry data associated with the UAV 110 to user device 120. UAV services platform 130 may additionally register and authenticate UAV 110 prior to use and may provide support for operational activities performed by UAV 110.

Networks 140-1 and 140-2 may include wired, wireless and/or optical networks that are capable of receiving and transmitting data, voice and/or video signals. For example, networks 140-1 and 140-2 may include one or more public switched telephone networks (PSTNs) or other type of switched network. Network 140-1 and 140-2 may also include one or more wireless networks and may include a number of wireless stations for receiving wireless signals and forwarding the wireless signals toward the intended destinations. Network 140-1 and 140-2 may further include one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 140-1 and 140-2 may provide packet-switched services and wireless Internet protocol (IP) connectivity to various components in environment 100, such as UAV 110, user device 120, and UAV services platform 130, to provide, for example, data, voice, and/or multimedia services.

In one implementation, network 140-1 is a different type of network than network 140-2. For example, network 140-1 may include a 4G network, a 4G LTE Advanced network, or a 5G network and network 140-2 may include a satellite network. In another implementation, network 140-1 is a same type of network as network 140-2. For example, network 140-1 and network 140-2 may both be a 4G network, a 4G LTE Advanced network, or a 5G network. In any event, regardless of the types of networks 140-1 and 140-2, each network provides a distinct communication path between UAV 110 and UAV services platform 130. Consistent with implementations described herein, UAV 110 may transmit messages or packets to UAV services platform 130 simultaneously over network 140-1 and network 140-2.

The exemplary configuration illustrated in FIG. 1 is provided for clarity. It should be understood that a typical environment may include more or fewer devices than illustrated in FIG. 1. For example, environment 100 may include a large number (e.g., hundreds or more) of UAVs 110 and user devices 120, as well as multiple UAV services platforms 130. As an example, environment 100 may include UAV services platforms 130 geographically distributed across a large service area (e.g., nationwide). Environment 100 (e.g., networks 140) may also include elements, such as evolved NodeBs (eNodeBs), next generation NodeBs (gNodeBs), base stations, switches, gateways, routers, monitoring devices, etc. (not shown), that aid in routing data in environment 100.

Various operations are described below as being performed by particular components in environment 100. In other implementations, various operations described as being performed by one device may be performed by another device or multiple other devices, and/or various operations described as being performed by multiple devices may be combined and performed by a single device.

Figure 2:
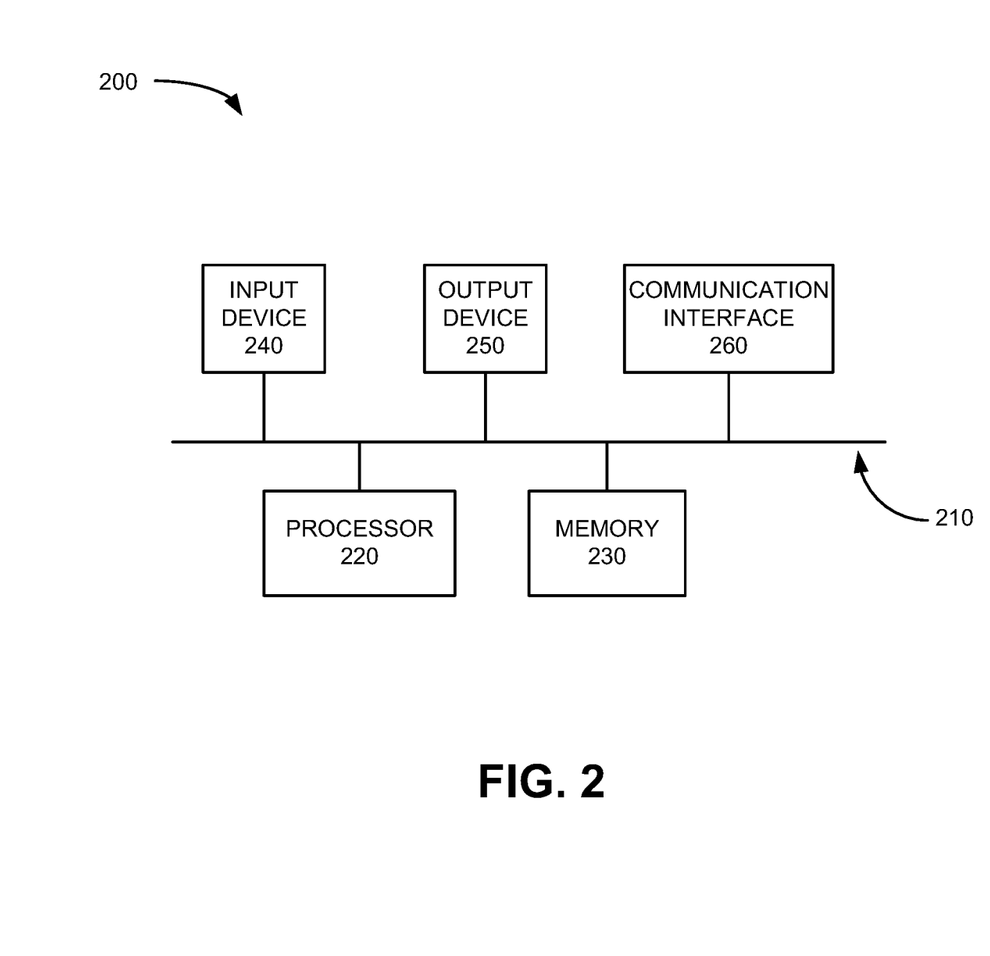
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in UAV 110, user device 120, and/or UAV services platform 130. Referring to FIG. 2, device 200 may include bus 210, processor 220, memory 230, input device 240, output device 250, and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include one or more modems, Ethernet or other data link layer interfaces, or other mechanisms for communicating with elements in a network.

In one implementation, device 200 (such as UAV 110) may include more than one communication interface 260. For example, device 200 may include a first communication interface 260 to communicate via network 140-1 and a second communication interface to communicate via network 140-2. In another implementation, device 200 may include more than one modem. For example, device 200 may include a first modem to communicate using a 4G LTE or 5G network and a second modem to communicate using a satellite network.

The exemplary configuration illustrated in FIG. 2 is provided for clarity. It should be understood that device 200 may include more or fewer components than illustrated in FIG. 2. For example, for device 200 implemented in UAV 110, device 200 may include a positioning system/satellite navigation system, such as a global positioning system (GPS) component, which may provide position information in relation to a standard reference frame, sensors and control circuitry to control and/or monitor the flight of UAV 110, as well as a battery to power UAV 110.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

In some implementations, UAV 110 may include a facility to allow for the transmission of multiple messages via multiple network paths. For example, the facility may implement an IP stack that allows UAV 110 to communicate over a network. In some implementations, the facility may include multiple IP stacks (or portions of IP stacks, such as below the UDP layer) that allow UAV 110 to communicate over multiple networks. Each IP stack may allow UAV 110 to obtain multiple IP addresses for communication over multiple networks. The facility may receive UDP messages containing telemetry information from application layer services, and may duplicate the UDP message through the multiple IP stacks to be transmitted through the multiple networks.

Figure 3:
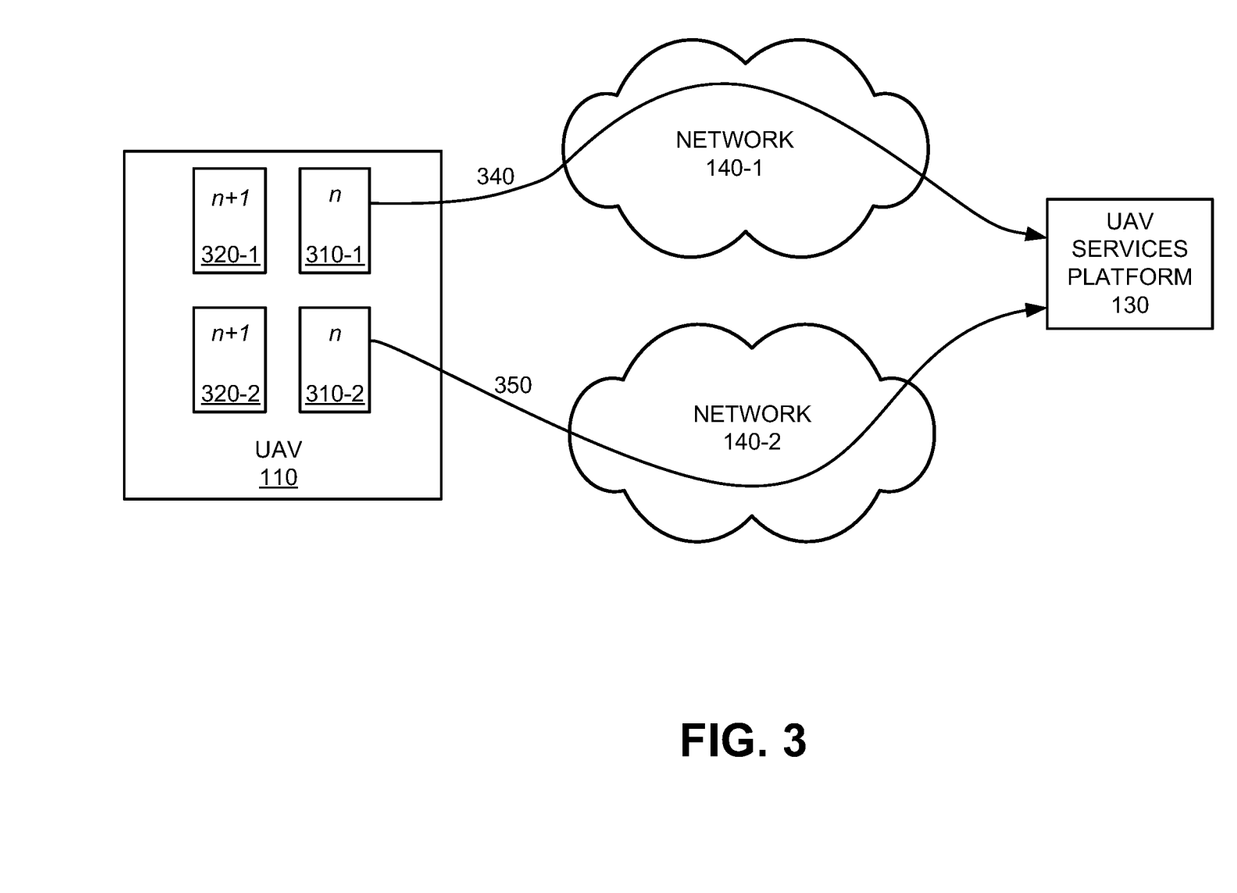
FIG. 3 is a diagram illustrating processing associated with operation of the multipathing system of FIG. 1 in accordance with an exemplary implementation.

FIG. 3 is a diagram illustrating exemplary processing associated with UDP multipathing. Referring to FIG. 3, UAV 110 may be in flight and may have received instructions to transmit telemetry data to UAV services platform 130. For example, UAV 110 may have received instructions from user device 120 or UAV services platform 130 to send location data to UAV services platform 130 every second. UAV 110 may transmit additional information to UAV services platform 130 before or during flight. For example, UAV 110 and UAV services platform 130 may communicate to authenticate UAV 110, to acknowledge instructions received from UAV services platform 130, to receive information regarding operational activities, or for additional purposes.

UAV 110 may collect telemetry information, such as location data or sensor data, to transmit to UAV services platform 130. UAV 110 may determine whether the telemetry information is to be sent to UAV services platform 130 via UDP multipathing. In one implementation, particular messages may not be sent via UDP multipathing. For example, some packets may be sent from UAV 110 to UAV services platform 130 via a single network 140. Additionally, some messages may be sent to UAV services platform using a Transmission Control Protocol (TCP) or a different protocol. Referring to FIG. 3, UAV 110 may determine that, based on instructions received from user device 120 or UAV services platform 130, the telemetry information is to be sent to UAV services platform 130 via network 140-1 and via network 140-2 using UDP, for example, by means of CoAP.

UAV 110 may generate messages that include the telemetry information at a particular time. For example, UAV 110 may generate messages 310-1 and 310-2 (e.g., UDP packets) that include the telemetry information at time t. UAV 110 may additionally label or tag messages 310-1 and 310-2 with an identifier, such as an integer. As shown in FIG. 3, messages 310-1 and 310-2 are labeled with the identifier n. In one implementation, the identifier may be an integer that is incremented for each message sent. For example, at time t+1, UAV 110 may generate messages 320-1 and 320-2 that include the telemetry information at time t+1 and UAV 110 may label messages 320-1 and 320-2 with the identifier n+1. The identifier may be located in various locations within the packet, with possibilities including the UDP checksum field or source port field, as a CoAP option value, as part of the payload.

As shown by arrow 340, UAV 110 may transmit message 310-1 to UAV services platform 130 via network 140-1. As shown by arrow 350, UAV 110 may transmit message 310-2 to UAV services platform 130 via network 140-2. In one implementation, network 140-1 may be an LTE or 5G network and network 140-2 may be a different type of network, such as a satellite network. In another implementation, networks 140-1 and 140-2 may both be LTE or 5G networks. UAV 110 may transmit messages 310-1 and 310-2 to UAV services platform 130 using UDP (e.g., CoAP). By using UDP, UAV services platform 130 does not need to acknowledge receipt of messages 310-1 and 310-2. Additionally, by using UDP, if connections in networks 140-1 and 140-2 are degraded, messages 310-1 and 310-2 may be dropped instead of buffered and transmitted at a later time.

UAV services platform may receive message 310-1 and/or message 310-2. For example, UAV services platform may receive message 310-1 at time w and may identify the identifier n associated with message 310-1. UAV services platform 130 may determine whether a message with identifier n has been received. For example, UAV services platform 130 may store the message or an indication of the messages that are received and may perform a lookup to determine whether a message with identifier n has been received. In this example, UAV services platform 130 may determine that a message with identifier n has not been received. In this case, UAV services platform may process message 310-1.

UAV services platform 130 may receive message 310-2 at time w+1 and may identify the identifier n associated with message 310-2. In this example, UAV services platform 130 may perform a lookup and may determine that a message with identifier n (i.e., message 310-1) has already been received. Since messages 310-1 and 310-2 include the same telemetry information and UAV services platform 130 has already processed message 310-1, UAV services platform 130 may discard or drop message 310-2.

Performing UDP multipathing may provide a more reliable overall throughput than transmitting messages over a single network 140. In addition, UDP multipathing may provide the shortest path and lowest latency possible between two networks 140. If one network 140 is experiencing congestion, packet drop or higher levels of latency, a different network 140 may be more performant in transmitting messages, and the telemetry data in the message will be ultimately received by the UAV services platform in a timely manner. In this way, UDP multipathing may provide a higher reliability and faster transmission of data than sending messages via a single network 140.

Figure 4:
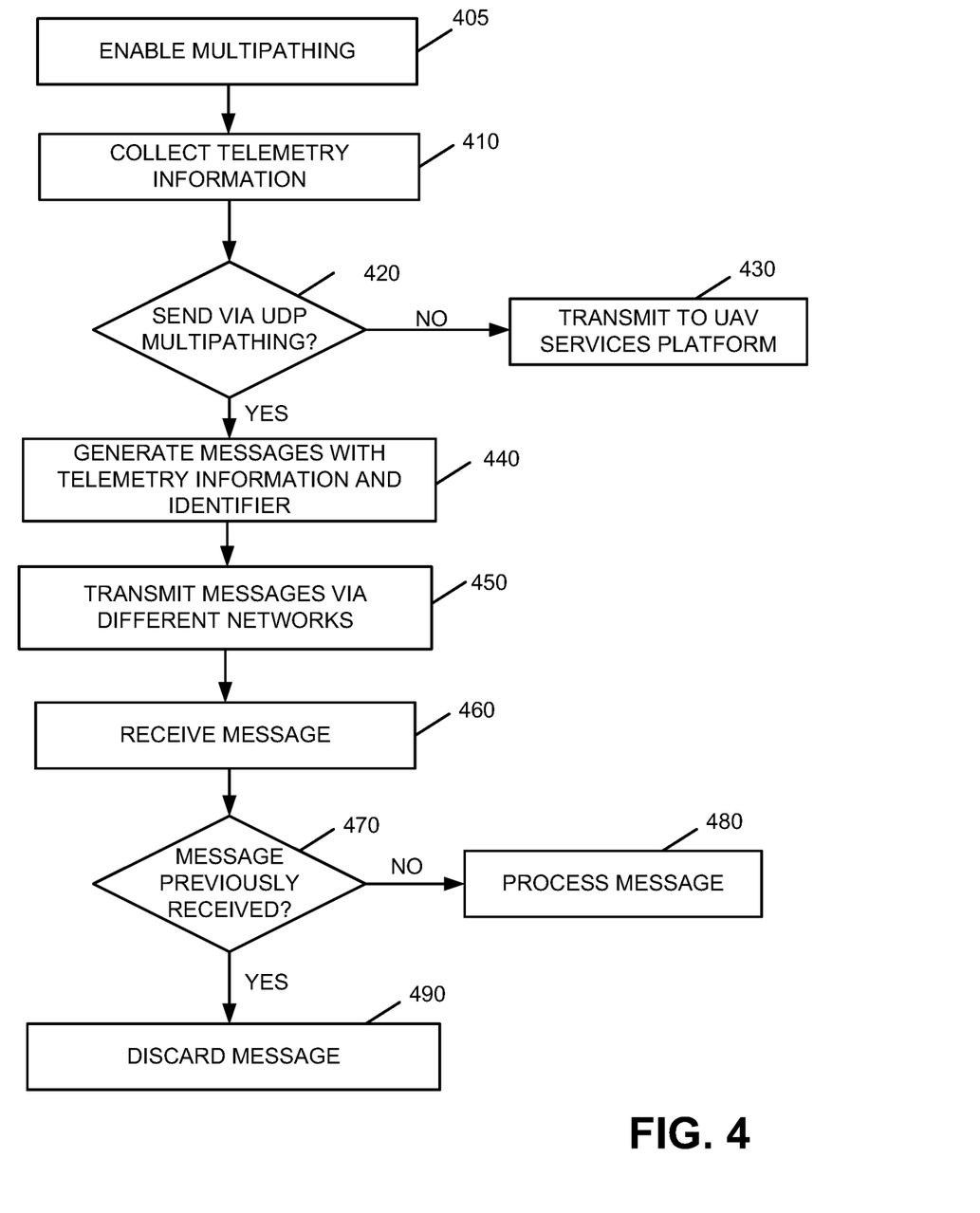
FIG. 4 is a flow diagram illustrating processing associated with operation of the multipathing system of FIG. 1 in accordance with an exemplary implementation.

FIG. 4 is a flow diagram illustrating processing associated with UDP multipathing of messages from UAV 110 to UAV services platform 130. The steps of FIG. 4 may be performed by UAV 110, UAV services platform 130, network 140-1, and/or network 140-2.

Processing may begin by enabling multipathing of communications by UAV 110 (block 405). For example, UAV services platform 130 may establish a connection between UAV 110 to set up the communications between them, and UAV services platform 130 may request that UAV 110 use multipathing to deliver data—e.g., telemetry data—to UAV services platform 103. In some embodiments, UAV 110 may indicate its capability to perform multipathing of communications, and/or UAV services platform 130 may be aware of the capability of UAV 110 to perform multipathing based on information known about UAV 110 (e.g., model number, pre-provisioned information concerning UAV 110, etc.). In some embodiments, UAV services platform 130 may specify specific data or data sets to transmit using multipathing, such as location data, sensor data, etc. In some implementations, UAV 110 may report whether multipathing is enabled and/or possible. For example, UAV 110 may attempt to connect to a second network using its network interface to use for the multipath communications, attempt communications with the UAV services platform 130 using the second network, and report whether the connection is successful.

UAV 110 may collect telemetry information (block 410). For example, UAV 110 may receive instructions from user device 120 or UAV services platform 130 to collect telemetry information while in flight. The instructions may additionally indicate that UAV 110 should transmit the telemetry information to UAV services platform 130 on a periodic basis (e.g., every second, every five seconds, every ten seconds, etc.). UAV 110 may determine whether the telemetry information is to be sent via UDP multipathing (block 420). UAV 110 may transmit some messages to UAV services platform 130 via UDP multipathing and may transmit some messages to UAV services platform 130 via a single path and/or using a different protocol (e.g., TCP). In some implementations, UAV 110 may determine whether the telemetry information is to be sent via UDP multipathing based on the instructions received from user device 120 or UAV services platform 130.

If the information is not to be sent via UDP multipathing (block 420—no), UAV 110 may transmit the information to UAV services platform 130 via normal communications—in this example, using network 140-1 (block 430). UAV 110 may additionally transmit the information using UDP or a different protocol. If UAV 110 determines that the information is to be sent via UDP multipathing (block 420—yes), UAV 110 may generate multiple messages that each include the telemetry information and an identifier (block 440). For example, if UAV 110 is to send the telemetry information via two networks, UAV 110 may generate two messages that include the telemetry information. UAV 110 may additionally label each message with an identifier. For example, UAV 110 may label each message with an integer. In one implementation, the integer may increment each time UAV 110 transmits a message with new telemetry information. Messages that include the same telemetry information may be labeled with the same integer.

UAV 110 may transmit each message via both network 140-1 and network 140-2 (block 450). For example, UAV 110 may transmit a first message including the telemetry information and identifier via network 140-1 and a second message including the telemetry information and identifier via network 140-2. In one implementation, networks 140-1 and 140-2 may be different types of networks (e.g., a cellular network and a satellite network). In another implementation, networks 140-1 and 140-2 may both be the same type of network (e.g., LTE or 5G network).

UAV services platform 130 may receive a message (block 460) and may determine whether the message has previously been received (block 470). For example, UAV services platform 130 may receive a message via network 140-1 or network 140-2 from UAV 110 and UAV services platform 130 may determine whether another message that includes the identifier included in the message has previously been received. If the message has not been previously received (block 470—no), UAV services platform may process the message (block 480). If the message has previously been received (block 470—yes), UAV services platform 130 may drop or discard the message (block 490). For example, in some implementations, UAV services platform 130 may store incoming messages or telemetry information, and may compare the message to previously received messages to determine if it has already been received. In some implementations, UAV services platform 130 may track the last identifier received from UAV 110, and may compare the incoming message to the last identifier. If the last identifier is equal to the identifier in the message, then the information in the message has already been received from a message received over the other network, and this message may be discarded. Likewise if the last identifier is greater than the identifier in the message, the message contains older information that is not current (possibly due to network delays) and the message may be discarded. In this way, UAV services platform 130 may not waste resources processing or storing duplicate or old information. In addition, by transmitting the information via multiple links, UAV services platform 130 may receive a higher percentage of messages sent by UAV 110 in a timely manner than if the messages were sent via a single network.

UAV services platform 130 may be in communications with multiple UAVs 110 concurrently. In such cases, UAV services platform 130 may track current messages and/or identifiers for each UAV 110.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

While series of acts have been described with respect to FIG. 5, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
at least one device comprising a processor, wherein the at least one device is configured to:
send, to an unmanned aerial vehicle (UAV), instructions to transmit a first type of telemetry data via a single path, and to transmit a second type of telemetry data via multipathing;
receive, from the UAV, the first type of telemetry data via the single path;
receive, from the UAV, a first duplicate message generated from the second type of telemetry data, wherein the first duplicate message is labeled with a first identifier and is received via a first network;
compare a first incremented value of the first identifier in a first header field to a second incremented value of a second identifier included in a second header field of a second duplicate message, received from the UAV, to determine whether the second duplicate message is generated from the second type of telemetry data and has been received previously from the UAV, via a second network that is different than the first network, wherein the first header field and the second header field differ;
process the first duplicate message when the first incremented value is equal to or greater than the second incremented value; and
discard the first duplicate message when the first incremented value is less than the second incremented value.

2. The system of claim 1, wherein the first duplicate message and the second duplicate message include telemetry information associated with a flight of the UAV, and wherein the second type of telemetry data includes at least one of location data or sensor data.

3. The system of claim 1, wherein the first identifier includes an incremented integer associated with the first duplicate message.

4. The system of claim 3, wherein, when determining whether the second duplicate message has been received previously from the UAV, the at least one device is configured to:
determine whether an identical message including a payload labeled with the second identifier has been received.

5. The system of claim 1, wherein the first network includes a Long Term Evolution (LTE) or a Fifth Generation (5G) network, and the second network includes a satellite network.

6. The system of claim 1, wherein the first network includes a first LTE network or a first 5G network, and the second network includes a second LTE network or a second 5G network.

7. The system of claim 1, wherein the first duplicate message and the second duplicate message are transmitted using a constrained application protocol (CoAP), and wherein the first header field comprises a user datagram protocol (UDP) checksum field and the second header field comprises a source port field.

8. A method comprising:
sending, to an unmanned aerial vehicle (UAV), instructions to transmit a first type of telemetry data via a single path, and to transmit a second type of telemetry data via multipathing;
receiving, from the UAV, the first type of telemetry data via the single path;
receiving, from the UAV, a first duplicate message generated from the second type of telemetry data, wherein the first duplicate message is labeled with a first identifier and is received via a first network;
comparing a first incremented value of the first identifier in a first header field to a second incremented value of a second identifier included in a second header field of a second duplicate message, received from the UAV, to determine whether the second duplicate message is generated from the second type of telemetry data and has been received previously from the UAV, via a second network that is different than the first network, wherein the first header field and the second header field differ;
processing the first duplicate message when the first incremented value is equal to or greater than the second incremented value; and
discarding the first duplicate message when the first incremented value is less than the second incremented value.

9. The method of claim 8, wherein the first duplicate message and the second duplicate message include telemetry information associated with a flight of the UAV, and wherein the second type of telemetry data includes at least one of location data or sensor data.

10. The method of claim 8, wherein the first duplicate message includes an incremented integer associated with the first duplicate message.

11. The method of claim 10, wherein determining whether the second duplicate message has been received previously from the UAV comprises determining whether an identical message including a payload labeled with the second identifier has been received.

12. The method of claim 8, wherein the first network includes a Long Term Evolution (LTE) or a Fifth Generation (5G) network, and the second network includes a satellite network.

13. The method of claim 8, wherein the first network includes a first LTE network or a first 5G network, and the second network includes a second LTE network or a second 5G network.

14. The method of claim 8, wherein the first duplicate message and the second duplicate message are transmitted using a constrained application protocol (CoAP), and wherein the first header field comprises a user datagram protocol (UDP) checksum field and the second header field comprises a source port field.

15. A non-transitory computer-readable medium having stored thereon sequences of instructions which, when executed by at least one processor, cause the at least one processor to:
send, to an unmanned aerial vehicle (UAV), instructions to transmit a first type of telemetry data via a single path, and to transmit a second type of telemetry data via multipathing;
receive, from the UAV, the first type of telemetry data via the single path;
receive, from the UAV, a first duplicate message generated from the second type of telemetry data, wherein the first duplicate message is labeled with a first identifier and is received via a first network;

compare a first incremented value of the first identifier in a first header field to a second incremented value of a second identifier included in a second header field of a second duplicate message, received from the UAV, to determine whether the second duplicate message is generated from the second type of telemetry data and has been received previously from the UAV, via a second network that is different than the first network, wherein the first header field and the second header field differ;

process the first duplicate message when the first incremented value is equal to or greater than the second incremented value; and discard the first duplicate message when the first incremented value is less than the second incremented value.

16. The non-transitory computer-readable medium of claim 15, wherein the first duplicate message includes telemetry information associated with a flight of the UAV, and wherein the second type of telemetry data includes at least one of location data or sensor data.

17. The non-transitory computer-readable medium of claim 15, wherein the first duplicate message includes an incremented integer associated with the first duplicate message.

18. The non-transitory computer-readable medium of claim 17, wherein the instructions that cause the at least one processor to determine whether the second duplicate message has been received previously from the UAV include instructions that cause the at least one processor to determine whether an identical message including a payload labeled with the second identifier has been received.

19. The non-transitory computer-readable medium of claim 15, wherein the first network includes a Long Term Evolution (LTE) or a Fifth Generation (5G) network, and the second network includes a satellite network.

20. The non-transitory computer-readable medium of claim 15, wherein the first network includes a first LTE network or a first 5G network, and the second network includes a second LTE network or a second 5G network.

* * * * *